R. M. ODELL.
RECEPTACLE AND CARRIER FOR EGGS.
APPLICATION FILED JAN. 14, 1920.
1,397,540.
Patented Nov. 22, 1921.
3 SHEETS—SHEET 2.
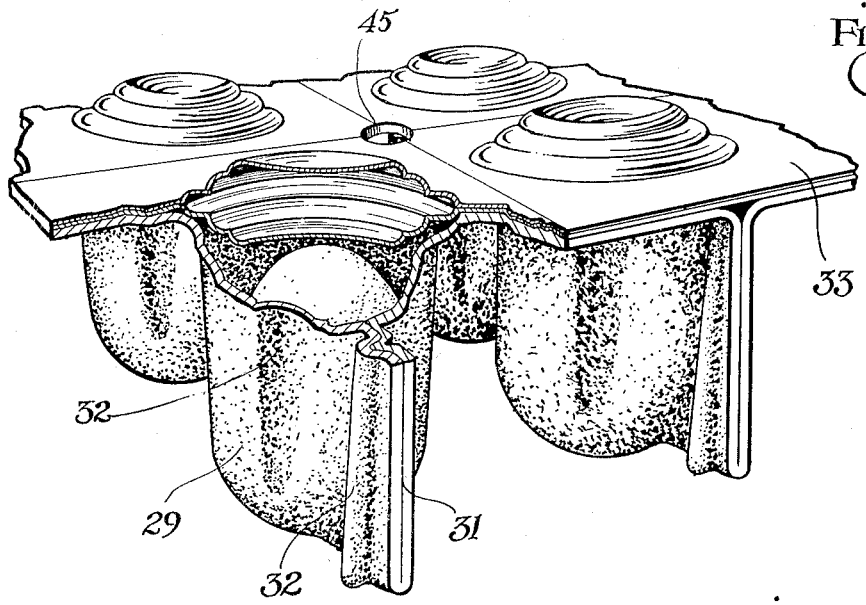
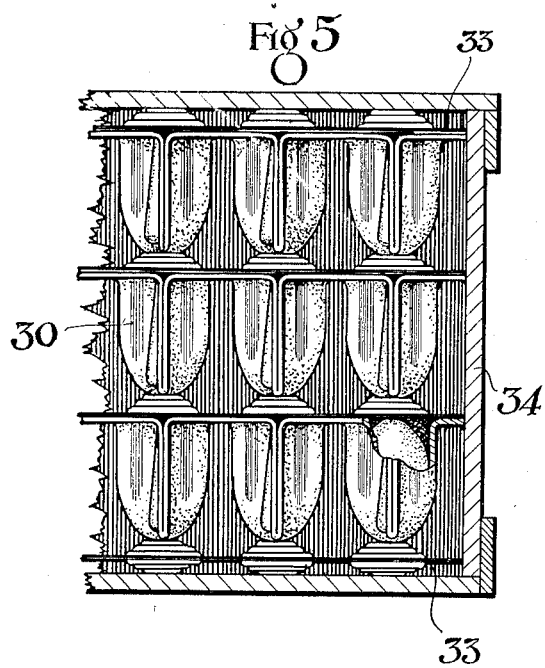
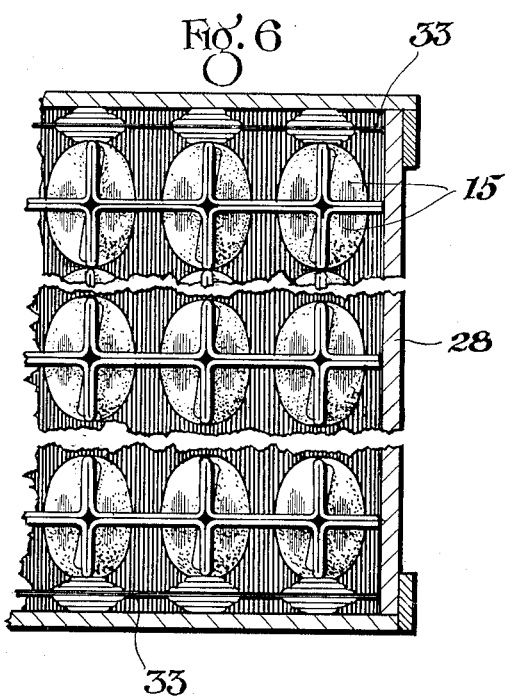
WITNESSES
INVENTOR
Risdon Moore Odell.
BY
ATTORNEYS

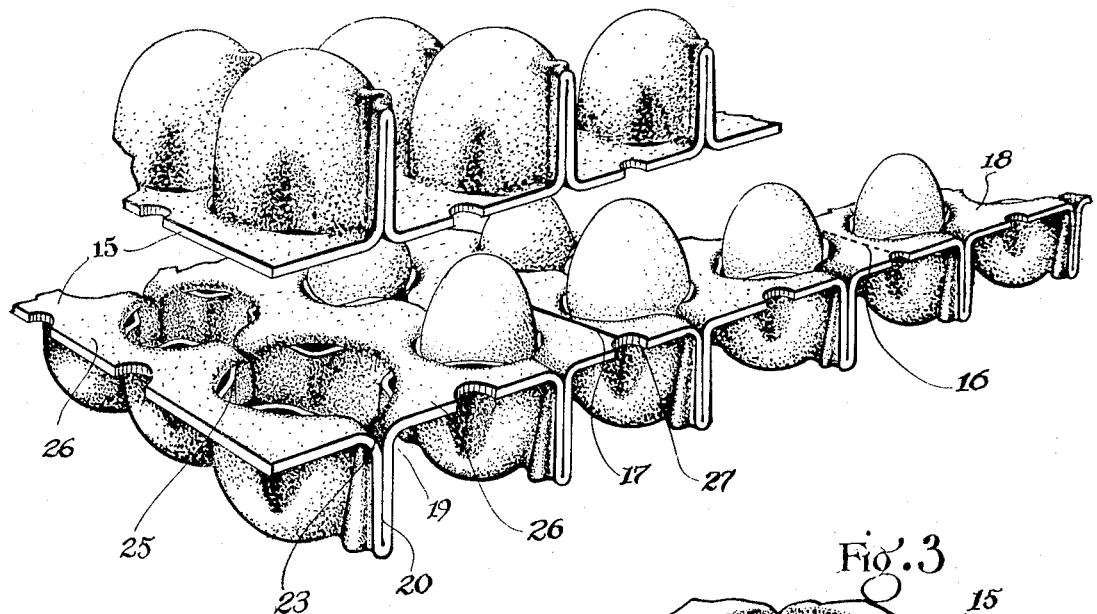
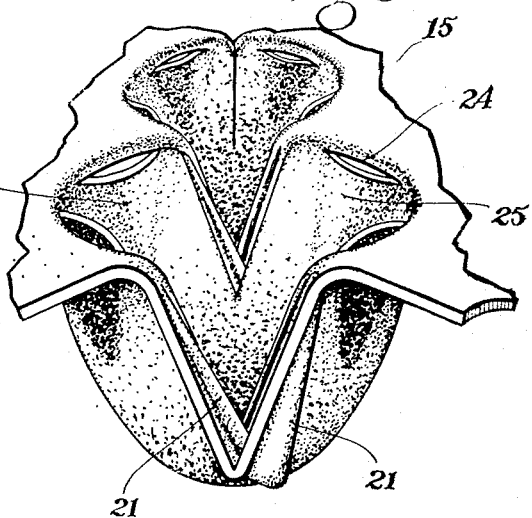
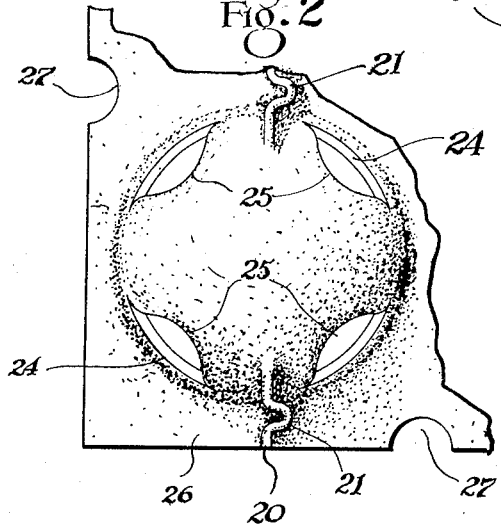

R. M. ODELL.
RECEPTACLE AND CARRIER FOR EGGS.
APPLICATION FILED JAN. 14, 1920.

1,397,540.  Patented Nov. 22, 1921.
3 SHEETS—SHEET 3.

WITNESSES

INVENTOR
Risdon Moore Odell
BY
ATTORNEYS

UNITED STATES PATENT OFFICE.

RISDON MOORE ODELL, OF DECATUR, ILLINOIS.

RECEPTACLE AND CARRIER FOR EGGS.

1,397,540.     Specification of Letters Patent.     Patented Nov. 22, 1921.

Application filed January 14, 1920. Serial No. 351,377.

*To all whom it may concern:*

Be it known that I, RISDON M. ODELL, a citizen of the United States, and a resident of Decatur, in the county of Macon and State of Illinois, have invented certain new and useful Improvements in Receptacles and Carriers for Eggs, of which the following is a specification.

My present invention relates generally to the transportation of eggs in the usual egg case in fillers as well as in cartons holding one dozen or more of eggs and more particularly to carton-fillers for such egg cases, my primary object being the provision of a receptacle capable of use with shipments of eggs in the ordinary egg case which will prevent breakage of eggs, which will provide for a free circulation of air in cold storage, and which will allow of ready examination of the eggs while in transit or storage.

A further object is the provision of a filler in the nature of an egg tray having a series of attached egg pockets, cups or cells, the tray being adapted to fit the ordinary egg case and also adapted for sub-division into cartons containing a dozen eggs more or less, so that the egg trays of a case may be utilized for re-shipments or for retail delivery without necessitating the use of special cartons for this purpose.

A still further object is the provision of a novel egg supporting means which will be strong and durable and which will readily lend itself to the various requirements of both domestic and export trade.

A still further object is the provision of a filler in the nature of a cushion mat or embossed flat which can be used between as well as above and below the egg trays in order to absorb breaking shocks and crushing strains.

A still further object is the provision of an egg tray for use in egg cases, each of the egg pockets, cups or cells of which is provided with egg engaging means, the nature of which is such as to support an egg flexibly in a more or less floating condition, capable of adaption or accommodation as between large, small and medium eggs.

A still further object is the provision of means by which such egg trays may be nested for shipment in order to economize space in transportation.

In the accompanying drawings which illustrate my present inventions,

Figure 1 is a perspective view of portions of egg trays embodying my present inventions, Fig. 2 is a bottom plan view of one of the egg cells, cups or pocket, Fig. 3 is a perspective view of a portion of the tray looking along one line of the cells, cups or pockets and shows the manner in which the cells of the trays may be finished in manufacture, so that they will easily nest in order to economize space in transportation, Fig. 4 is a perspective view illustrating a slightly modified form of construction, Fig. 5 is a vertical section through a portion of an egg case embodying the modified egg trays of Fig. 4, Fig. 6 is a vertical section through a portion of an egg case embodying the form of tray shown in Figs. 1, 2 and 3

Figure 8:
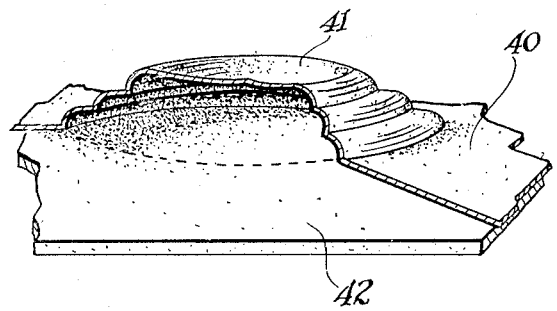
Fig. 8 is a sectional perspective view of a slightly modified form.

Referring now to these figures, my invention in the first instance proposes a filler in the nature of an egg tray 15 as seen in Fig. 1 having its egg cells, cups or pockets in parallel rows and formed of paper, paper pulp or other material of a nature which will lend itself to the necessary pressing into shape or molding to form.

It is well known, that in connection with the usual egg case of common use, each egg tray has a capacity of 36 eggs and each such egg tray is in accordance with my invention provided with a perforated or weakened line 16 between its second and third rows from one side so that one side portion containing two longitudinal rows may be detached. The tray is also provided with a scored line 17 between its second and third rows from the opposite edge so that the remaining portion of the tray, after its section 18 at one side of the perforated line 16 is removed, may be folded on the score line 17 and the halves thereof superposed one on the other to produce a carton of a twelve egg capacity.

It is to be understood, however, that the capacity of the egg tray in the first instance may be varied or by other perforated and scored lines the ultimate capacity of the carbon may be regulated.

In forming the egg tray 15 in accordance with my invention, parallel rows of egg cells, cups or pockets 19 are constructed along lengthwise parallel fold 20 which extend for the full depth of the egg cells, cups, or pockets and which have vertical crimped portions 21 in the nature of inter-engaging ribs and recesses, at opposite sides of each and every egg cell, cup or pocket along the line of the fold so that for the major portions of their depth and from their basis upward the egg cells, cups or pockets are entirely isolated in order to prevent leakage of a broken egg into any other cell, cup or pocket or to the sides of the egg case.

It will be noted, however, that at the open ends of the egg cells, cups or pockets, the bases of which are entirely closed, the fold 20 slightly opens in order to provide air circulating spaces or grooves 23 by means of which free circulation of air is provided for lengthwise along the line of each row of eggs.

Around its open end, each egg cell, cup or pocket is further provided with circumferential slits 24, and has the portions of its surrounding wall below the slits pressed inwardly to form a series of egg engaging shock absorbing indentations 25, the spaces between whose inner faces is not greater than a small egg although the capacity of the cell, cup or pocket itself is at least sufficient to receive a large egg. Each of these shock absorbing indentations is free to yield outwardly more or less to the plane of the wall of its particular cell, cup or pocket so that large, medium or small eggs will be similarly engaged to hold the same against shock and in a more or less floating position in the cells, cups or pockets.

The tray 15 is provided there around with laterally outstanding edges 26 projecting beyond the cells, cups or pockets and adapted to form buffers against the inner walls of an egg case, and it will be noted from Fig. 1, in particular that the folds 20 are extended with their ends flush with the adjacent laterally projecting edges 26 so as to coöperate with the latter in their functions as buffers and also render the entire structure more stable. These projecting edges 26 are provided at spaced points therein with recesses 27 adapted to form finger holds whereby the fingers may be inserted along the sides of an egg case and the egg tray readily lifted therefrom with its eggs in position.

As in Figs. 1, 2 and 3, from an examination of the latter of which the particular manner of relative engagement of the egg cells, cups or pockets separating crimps will be understood, it will be noted that each tray has cells, cups or pockets of approximately half the depth of an egg, and that the trays are utilized in inverted pairs. This is apparent from an inspection of Fig. 6 wherein the trays 15 are shown in position within an egg case 28.

As seen in Fig. 4, however, the trays otherwise constructed as previously described, may be formed with egg cells, cups or pockets 29 of the full depth of an egg, these cells, cups or pockets being isolated from one another along the major portions of their length by crimps 21 at opposite sides thereof in the cell, cup or pocket forming folds 31 and having shock-absorbing indentations 32 which yieldingly engage and hold the eggs from rolling as previously described.

Both forms of the invention are adapted for use with their fillers in the nature of cushion mats, each cushion mat having a series of cushion elements so disposed as to aline vertically with the egg cells, cups or pockets in the egg case.

By comparison of Figs. 5 and 6 in the former of which trays having cells, cups or pockets 30 of full egg depth are utilized in the egg case 34, it will be noted the cushion mats 33 are disposed between the egg trays and also above and below the same adjacent to top and base of the egg case, while in Fig. 6 the cushion mats 33 are omitted from between the tray layers and used only at the top and base of the egg case.

Figure 7:
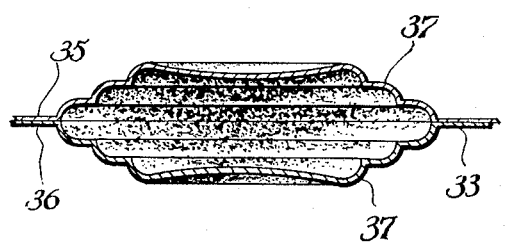
Fig. 7 is a vertical section through one of the air cushion members.

As seen in Figs. 4, 5, and 6 and also in the detailed section of Fig. 7 the cushion mats 33 may be formed by superposing concentrically embossed layers 35 and 36, each empossed portion 37 being of stepped formation and of circular shapes. That this particular shape may be varied is evident from Figs. 11 and 12 in which the embossed portions 37$^a$ of the cushion mats 33$^a$ are of diamond shape, although otherwise of stepped formation, previously described.

Figure 10:
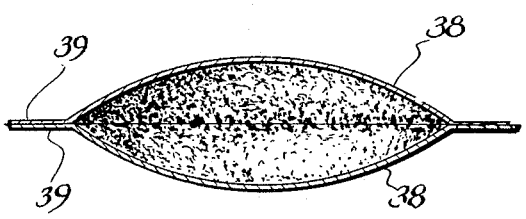
Figure 12:
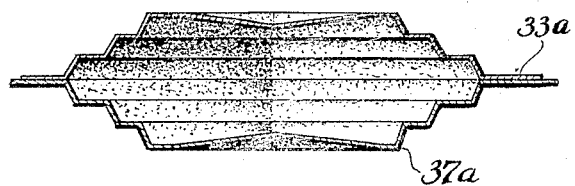
Fig. 12 is a section through a portion of Fig. 11.
Figure 11:
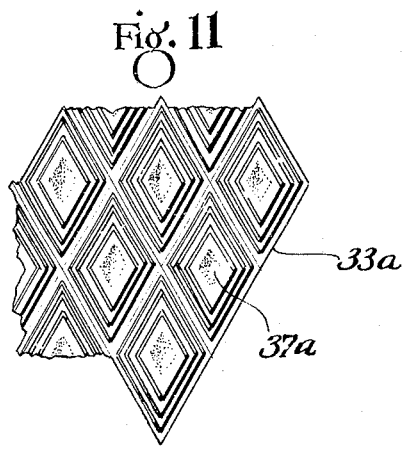
Fig. 11 is a partial top plan view illustrating a diamond shaped air cushion.

In Fig. 10 embossed portions 38 are shown in opposing relation in connection with superposed layers 39 forming the cushion mat, these embossed portions 38 being of circular form without the stepped concentric construction of Figs. 7, 11 and 12.

Figure 9:
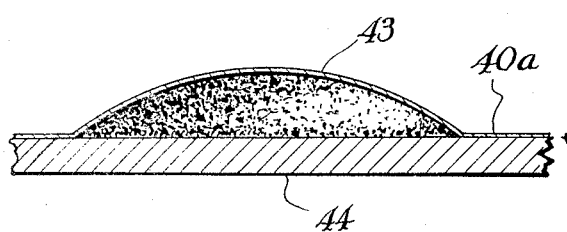
Figs. 9 and 10 are sectional views through certain other modified forms.

It is also possible to utilize a cushion mat, only one of the layers 40 of which is embossed as seen in Figs. 8 and 9, the embossed layer 40 of Fig. 8 having the concentric stepped formation previously described, and as indicated at 41 next to an unembossed layer 42 and the embossed layer 40$^a$ of Fig. 9 having a plain embossed portion 43 like those of Fig. 10 in connection with a plain flat layer 44.

Thus according to either of the forms of the inventions as illustrated and described, it is obvious my invention provides for the safe transportation of the eggs and that in connection with the form of egg tray shown in Figs. 1 to 3 inclusive, I further provide for a sub-division of the egg trays in order to promote ready formation of egg cartons in the manner previously specified.

As seen particularly in Fig. 4 circulation of air is provided for along the upper open portions of the fold 31 the same as previously described in connection with the egg tray of Figs. 1 to 3 inclusive, and it will also be observed from Fig. 4 that each of the fillers in the nature of cushion mats may have openings 45 between their cushion members so as to further promote free circulation of air, particularly in cold storage, and thus supplement the shock-absorber forming slits and the open portions of the folds in respect to this particular function.

It is understood, however, that the various principles embraced in this invention may be applied to fillers, cartons or other kinds of containers and carriers for packing fruits, vegetables and sundry fragile articles of merchandise and that its form may be changed to adapt itself to the size, shape and contour of the article for which it is especially designed.

I claim:

1. A filler in the nature of an egg tray having parallel rows of egg receiving cells, cups or pockets spaced apart in the rows and having folds extending through the rows of cells, cups or pockets, said folds extending for approximately the full depth of the cells, cups or pockets and having means in the nature of crimps in the spaces between said cells, cups or pockets to prevent communication therebetween for the major portions of their depth as described.

2. A filler in the nature of an egg tray having a plurality of egg receiving cells, cups or pockets, closed at one end and provided with circumferential slits at spaced points therearound and with indented portions at one side of the slits to yieldingly engage eggs of varying sizes.

3. A filler in the nature of an egg tray having a plurality of egg receiving cells, cups or pockets closed at one end, the walls of which cells, cups or pockets are provided with circumferential slits adjacent to their open ends and have circumferentially spaced indented portions below the slits, as and for the purpose described.

4. A filler in the nature of an egg tray, having parallel rows of egg receiving cells, cups or pockets and having folds extending through the said cells, cups or pockets, each of which folds have crimped portions at opposite sides of each of the cells, cups or pockets, as described.

5. A filler in the nature of an egg tray having parallel rows of egg receiving cells, cups or pockets and having folds extending through the said cells, cups or pockets, each of which folds is provided with inter-engaging ribs and recesses at opposite sides, and along the major portion of the depth, of each of the cells, cups or pockets.

6. A filler in the nature of an egg tray having parallel rows of egg receiving cells, cups or pockets and provided with folds extending through the cells, cups or pockets and having means at opposite sides of each of the said cells, cups or pockets, adapted to isolate the cells, cups or pockets for the major portions of their depth.

7. A filler in the nature of an egg tray, having parallel rows of egg receiving cells, cups or pockets and provided with folds extending through the cells, cups or pockets and having means at opposite sides of each of the said cells, cups or pockets adapted to isolate the cells, cups or pockets for the major portions of their depth, the upper portions of the said folds being open adjacent to the open ends of the cells, cups or pockets to permit of free circulation of air.

8. A filler in the nature of an egg tray, having a plurality of egg holding cells, cups or pockets and provided with laterally outstanding edges around the cells, cups or pockets, said tray having folds therein extending through the egg cells, cups or pockets and projecting at their ends approximately flush with certain of the edges of the tray, said edges of said tray being provided with spaced recesses forming finger openings for the purpose specified.

RISDON MOORE ODELL.